United States Patent
Choi et al.

(10) Patent No.: US 8,391,227 B2
(45) Date of Patent: Mar. 5, 2013

(54) COMMUNICATION SYSTEM AND METHOD FOR SINGLE-POINT TRANSMISSION AND RECEPTION AND COORDINATED MULTI-POINT TRANSMISSION AND RECEPTION

(75) Inventors: Hyun Ho Choi, Suwon-si (KR); Dan Keun Sung, Daejeon (KR); Seon Yeob Baek, Daejeon (KR); Byoung Hoon Jung, Daejeon (KR); Kab Seok Ko, Daejeon (KR); Ji Young Cha, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 367 days.

(21) Appl. No.: 12/759,233

(22) Filed: Apr. 13, 2010

(65) Prior Publication Data
US 2011/0034171 A1   Feb. 10, 2011

(30) Foreign Application Priority Data
Aug. 5, 2009 (KR) .................. 10-2009-0071933

(51) Int. Cl.
*H04W 4/00* (2009.01)
(52) U.S. Cl. ........ 370/329; 370/315; 370/328; 370/330; 370/335; 370/342; 370/343; 455/450; 455/451; 455/452.1; 455/452.2; 455/422.1; 455/524; 455/509; 455/59; 455/101
(58) Field of Classification Search .......... 455/436, 455/450, 451, 452.1, 452.2, 422.1, 7, 13.1, 455/16, 59, 509, 524, 101; 370/315, 328, 370/329, 330, 342, 343
See application file for complete search history.

(56) References Cited

U.S. PATENT DOCUMENTS

| 8,208,936 | B2* | 6/2012 | Lindoff et al. ............. 455/452.1 |
| 8,238,299 | B2* | 8/2012 | Lee et al. ...................... 370/329 |
| 2008/0181180 | A1 | 7/2008 | Karaoguz | |
| 2008/0188234 | A1 | 8/2008 | Gorokhov et al. | |
| 2009/0103472 | A1* | 4/2009 | Ni et al. ........................ 370/315 |

(Continued)

FOREIGN PATENT DOCUMENTS

| JP | 2006-180320 A | 7/2006 |
| JP | 2008-263595 A | 10/2008 |

(Continued)

OTHER PUBLICATIONS

STefan Parkvall, Erik Dahlman, Anders Furuskar, Ylva Jading, Magnus Olsson, Stefan Wanstedt, Kambiz Zangi, LTE-Advanced—Evolving LTE towards IMT-Advanced, 21-24 2008, Vehicular Technology Conference, VTC 2008, conference publications, pp. 1-5.*

*Primary Examiner* — Olumide T Ajibade Akonai
(74) *Attorney, Agent, or Firm* — NSIP Law

(57) ABSTRACT

A communication system and method for single-point transmission and reception and coordinated multi-point transmission and reception are provided. The system and method include determining information associated with a channel status of a target terminal. The system and method also include selecting, with respect to the target terminal, one of single-point transmission and reception and coordinated multi-point transmission and reception based on the information associated with the channel status of the target terminal.

27 Claims, 14 Drawing Sheets

U.S. PATENT DOCUMENTS

2010/0080269 A1* 4/2010 Kim et al. .................... 375/211
2010/0173659 A1* 7/2010 Shin et al. .................... 455/500
2010/0272032 A1* 10/2010 Sayana et al. ................ 370/329

FOREIGN PATENT DOCUMENTS

KR 10-2008-0041513 A 5/2008
KR 10-2009-0015618 A 2/2009

* cited by examiner

HIGH MOBILITY ⇒ SP
LOW MOBILITY ⇒ CoMP

FIG. 4

| | AREA A | AREA B | AREA C | SCENARIO |
|---|---|---|---|---|
| case 1 | CoMP with X | CoMP with X $\overset{HO}{\Rightarrow}$ CoMP with Y | CoMP with Y | slow |
| case 2 | SP with X | SP with X $\overset{HO}{\Rightarrow}$ SP with Y | SP with Y | fast |
| case 3 | SP with X | SP with X $\overset{HO}{\Rightarrow}$ SP with Y | CoMP with Y | fast $\Rightarrow$ slow |
| case 4 | CoMP with X | CoMP with X $\overset{HO}{\Rightarrow}$ CoMP with Y | SP with Y | slow $\Rightarrow$ fast |

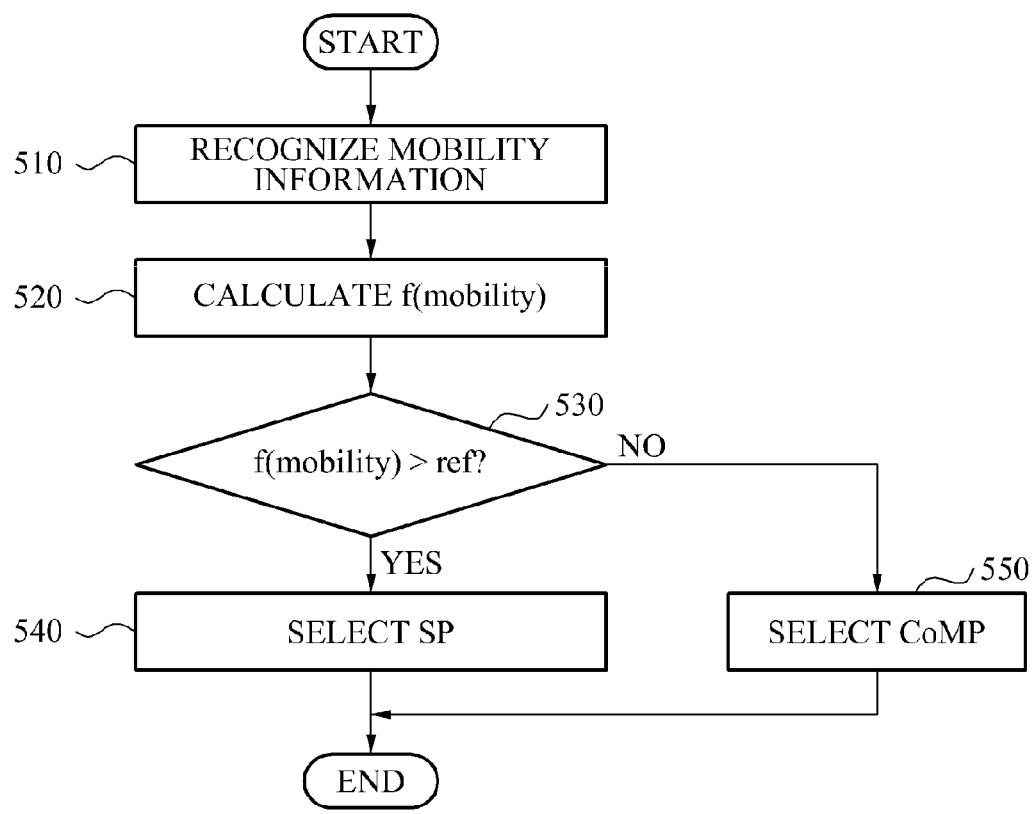

FIG. 9

| CASE \ DEFINITION | $\tau_{SP} = \min\left(\frac{\tau_O}{\theta_i}, \tau_{max}\right)$ | $\tau_{CoMP} = \max\left(\theta_i \tau_1, \tau_{min}\right)$ | OPERATION |
|---|---|---|---|
| VELOCITY INCREASE ($\theta_i$ INCREASE) | $\tau_{SP}$ DECREASE | $\tau_{CoMP}$ INCREASE | PREFER SP |
| VELOCITY DECREASE ($\theta_i$ DECREASE) | $\tau_{SP}$ INCREASE | $\tau_{CoMP}$ DECREASE | PREFER CoMP |

FIG. 11
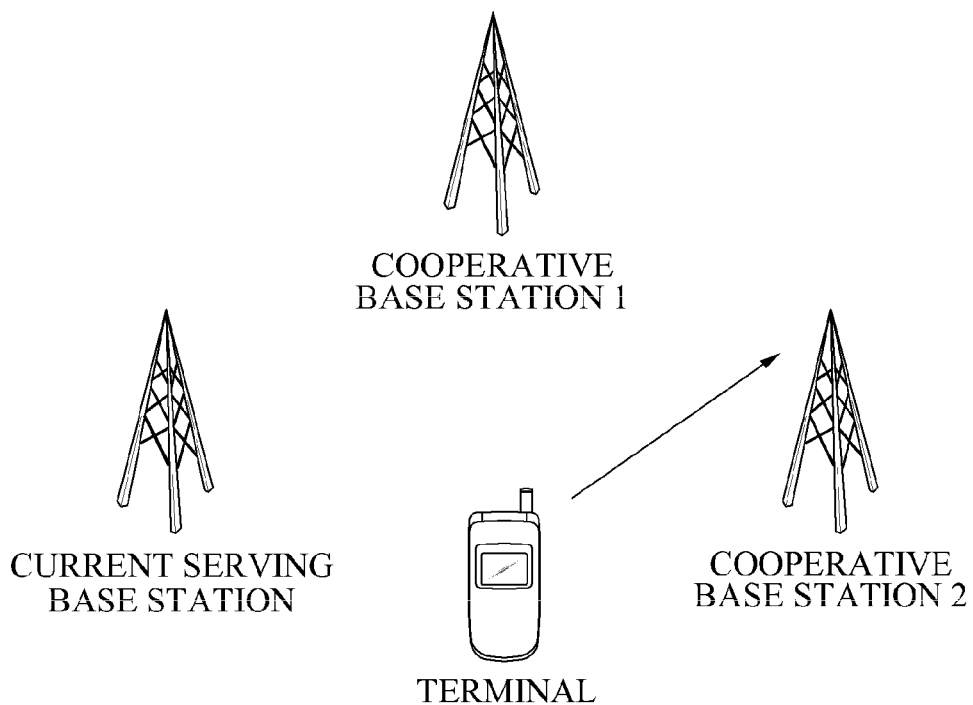
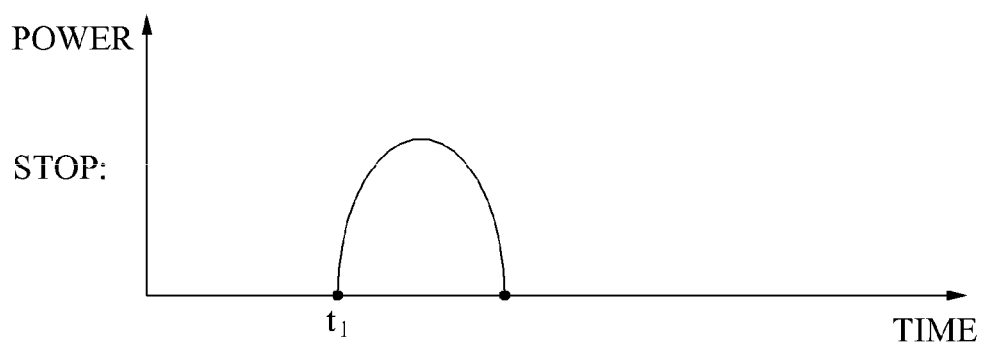
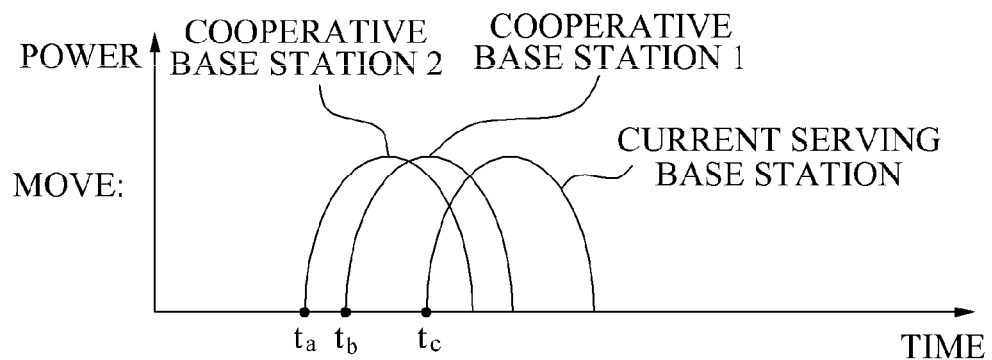

COMMUNICATION SYSTEM AND METHOD FOR SINGLE-POINT TRANSMISSION AND RECEPTION AND COORDINATED MULTI-POINT TRANSMISSION AND RECEPTION

CROSS-REFERENCE TO RELATED APPLICATION

This application claims the benefit under 35 U.S.C. §119 (a) of Korean Patent Application No. 10-2009-0071933, filed on Aug. 5, 2009, in the Korean Intellectual Property Office, the entire disclosure of which is incorporated herein by reference for all purposes.

BACKGROUND

1. Field

The following description relates to a communication system that may implement a single-point transmission and reception scheme and a coordinated multi-point transmission and reception scheme.

2. Description of Related Art

A coordinated multi-point transmission and reception scheme enables a plurality of base stations to simultaneously transmit/receive signals to and from terminals located in a cell edge. A coordinated multi-point transmission and reception scheme typically provides a superior data rate with respect to a single-point transmission and reception scheme.

A single-point transmission and reception scheme is distinguishable from the coordinated multi-point transmission and reception scheme, in that it enables terminals to transmit and receive a signal to and from a single base station. A single-point transmission and reception scheme typically uses less overhead than a coordinated multi-point transmission and reception scheme.

SUMMARY

In one general aspect, a transmission and reception controlling method includes determining information associated with a channel status of a target terminal, and selecting, with respect to the target terminal one of single-point transmission and reception and coordinated multi-point transmission and reception based on the information associated with the channel status of the target terminal.

The selecting operation may further include selecting one of single-point transmission and reception and coordinated multi-point transmission and reception based on a variation in the channel status of the target terminal.

The selecting operation may further include selecting one of single-point transmission and reception and coordinated multi-point transmission and reception based on feedback overhead or gain with respect to each of single-point transmission and reception and coordinated multi-point transmission and reception.

The information associated with the channel status of the target terminal may include information associated with a mobility of the target terminal.

The selecting operation may further include selecting single-point transmission and reception in response to the target terminal having a mobility greater than a reference value.

The selecting operation may further include selecting coordinated multi-point transmission and reception in response to the target terminal having a mobility less than a reference value.

The information associated with the mobility of the target terminal may further include information associated with at least one of a velocity of the target terminal and a variation in the channel status of the target terminal.

The selecting operation may further include calculating a criterion value based on the information associated with the channel status of the target terminal, and selecting one of single-point transmission and reception and coordinated multi-point transmission and reception according to the calculated criterion value.

The method may further include performing a post process according to the selected single-point transmission and reception or coordinated multi-point transmission and reception.

In another general aspect, a transmission and reception controlling method includes determining a margin time for single-point transmission and reception and a margin time for coordinated multi-point transmission and reception based on information associated with a channel status of a target terminal, and selecting one of single-point transmission and reception and coordinated multi-point transmission and reception based on the margin time for single-point transmission and reception and margin time for the coordinated multi-point transmission and reception.

The method may further include determining if a condition for single-point transmission and reception is satisfied with respect to the margin time for single-point transmission and reception, and selecting single-point transmission and reception if the condition is satisfied.

The method may further include determining if a condition for coordinated multi-point transmission and reception is satisfied with respect to the margin time for multi-point transmission and reception, and selecting coordinated multi-point transmission and reception if the condition is satisfied.

The determining operation may further include decreasing the margin time for single-point transmission and reception in response to a mobility of the target terminal inceasing, and decreasing the margin time for coordinated multi-point transmission and reception in response to a mobility of the target terminal decreasing.

The determining operation may further include periodically or aperiodically updating the margin time for single-point transmission and reception and the margin time for coordinated multi-point transmission and reception.

The information associated with the channel status of the target terminal may further include information associated with a mobility of the target terminal.

The information associated with the mobility of the target terminal may further include information associated with at least one of a velocity of the target terminal and a variation in the channel status of the target terminal.

The method may further include calculating a mobility factor of the target terminal, and the determining may further include determining the margin time for single-point transmission and reception and the margin time for coordinated multi-point transmission and reception based on the mobility factor of the target terminal.

The mobility factor may be associated with a variation in a received signal strength at the target terminal with respect to each of a first base station and a second base station.

The method may further include determining an effective signal to interference-plus-noise ratio (SINR) with respect to the received signal strength at the target terminal, and determining resource area information based on the determined effective SINR.

The determining operation may further include determining the margin time for single-point transmission and reception and the margin time for coordinated multi-point transmission and reception with respect to a system parameter.

The system parameter may be periodically or aperiodically broadcast from a base station to the terminal.

The system parameter may include a single value broadcast from a base station to the terminal.

The system parameter may include a range of values broadcast from a base station to the terminal.

The selecting operation may further include performing a process for a handover of the target terminal.

In another general aspect, a method for a handover includes determining points in time that signals transmitted from a plurality of base stations are received at a terminal, and selecting a serving base station from the plurality of base stations based on the determined points in time.

The method may further include determining propagation delays of the signals transmitted from the plurality of base stations, based on the determined points in time, and the selecting operation may further include selecting the serving base station from the plurality of base stations based on the propagation delays.

The selecting operation may further include selecting the serving base station as a base station corresponding to a signal received at the terminal earliest from among the signals transmitted from a plurality of base stations.

In another general aspect, a computer-readable recording medium storing a program to control transmission and reception, includes instructions to cause a computer to determine information associated with a channel status of a target terminal, and select, with respect to the target terminal, one of single-point transmission and reception and coordinated multi-point transmission and reception based on the information associated with the channel status of the target terminal In another general aspect, a communication apparatus includes a recognition unit to determine information associated with a channel status of a target terminal, and a selecting unit to select, with respect to the target terminal, one of single-point transmission and reception and coordinated multi-point transmission and reception based on the information associated with the channel status of the target terminal.

In another general aspect, a communication apparatus includes a decision unit to determine a margin time for single-point transmission and reception and a margin time for coordinated multi-point transmission and reception based on information associated with a channel status of a target terminal, and a processing unit to select one of single-point transmission and reception and coordinated multi-point transmission and reception based on the margin time for single-point transmission and reception and the margin time for coordinated multi-point transmission and reception.

In another general aspect, a communication apparatus includes a recognition unit to determine points in time that signals transmitted from a plurality of base stations are received at a terminal, and a selecting unit to select a serving base station from the plurality of base stations based on the determined points in time.

According to certain embodiments, one of single-point transmission and reception and coordinated multi-point transmission and reception may be selected with respect to a target terminal based on a channel status or a mobility of the target terminal. Accordingly, significant increases in feedback overhead may be avoided while facilitating gain associated with coordinated multi-point transmission and reception.

According to certain embodiments, one of single-point transmission and reception and coordinated multi-point transmission and reception may be selected by determining a margin time for single-point transmission and reception or a margin time for coordinated multi-point transmission and reception based on a mobility of a target terminal.

According to certain embodiments, a base station may be selected from a plurality of base stations based on determined points in time that signals transmitted from the plurality of base stations are received at a terminal. Accordingly, a handover operation may be facilitated.

Other features and aspects will be apparent from the following detailed description, the drawings, and the claims.

BRIEF DESCRIPTION OF THE DRAWINGS

FIG. 4 is a table illustrating an example of selecting a single-point transmission and reception scheme or a coordinated multi-point transmission and reception scheme, based on a mobility of a terminal when the terminal moves from the base station X to the base station Y as illustrated in FIG. 3.

FIG. 5 is a flowchart illustrating an example of a transmission and reception controlling method.

FIG. 9 is a table illustrating examples of operations based on a variation in each of a margin time for a single-point transmission and reception scheme and a margin time for a coordinated multi-point transmission and reception scheme, when a mobility of a terminal is increasing or decreasing.

FIG. 11 is a diagram and graphs illustrating an example of signal reception at a moving terminal with respect to signals transmitted from a plurality of base stations in a coordinated multi-point transmission and reception scheme.

Figure 1:
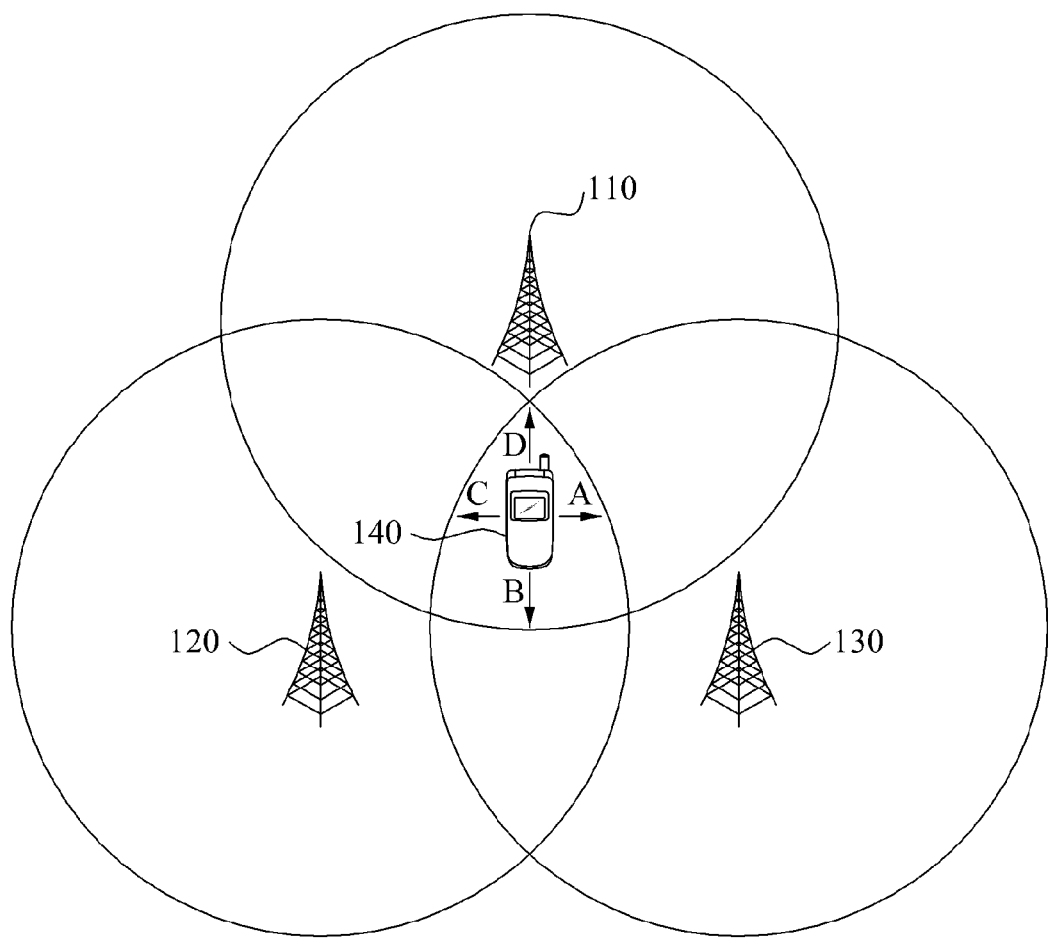
FIG. 1 is diagram illustrating an example of a multi-cell communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

Hereinafter, various examples will be described with reference to the accompanying drawings. The term "base station" used herein may include various types of devices to transmit signals to a terminal, for example, a general base station, a relay, and the like. The term "terminal" used herein may include various types of mobile devices, for example, a cellular phone, a notebook, and the like. The term "communication apparatus" used herein may include various types of apparatuses included in a communication system, for example, a base station, a relay, a terminal, a network controller, and the like.

FIG. 1 illustrates an example of a multi-cell communication system.

Referring to FIG. 1, the multi-cell communication system includes a plurality of base stations 110, 120, and 130 that may implement a coordinated multi-point transmission and reception (CoMP) scheme through a mutual cooperation. For example, the plurality of base stations 110, 120, and 130 may transmit signals to a terminal 140 located in a cell edge of each of the base stations 110, 120, and 130, through a mutual cooperation, thereby improving a data rate to the terminal 140.

The terminal 140 is located in the cell edge may prefer single-point transmission and reception (SP) over CoMP. For example, if the terminal 140 moves in one of directions A, B, C, and D at a relatively fast velocity, a channel status of the terminal 140 may significantly vary. In this example, the terminal 140 may need to feed back a comparatively large amount of information to support CoMP, for example, channel information to a current serving base station among the plurality of base stations 110, 120, and 130. This feedback of information may result in significantly increasing feedback overhead. Accordingly, the terminal 140 may prefer SP over CoMP. If the channel status of the terminal 140 significantly varies, the serving base station of the terminal 140 may be changed to a new serving base station, through a handover. The terminal 140 and the new serving base station may perform SP, thereby decreasing feedback overhead and attaining a desired data rate. In a CoMP scheme, a plurality of base stations cooperates with each other to transmit a signal to at least one terminal. In a SP scheme, a single base station transmits a signal to at least one terminal without cooperation with another base station.

Even if the terminal 140 moves within the cell edge, it may be ineffective to continuously maintain the SP. For example, if the terminal 140 moves within the cell edge at a slow velocity, the terminal 140 and a current serving base station may perform CoMP, thereby improving a data rate without significantly increasing feedback overhead.

According to an embodiment, an SP scheme or a CoMP scheme may be selected based on information associated with a channel status of a terminal (hereinafter, "channel information") that includes information associated with a mobility of the terminal. In addition to the channel information, other factors may be considered, such as feedback overhead, a desired quality of service (QoS) of the terminal, a network load, a network delay, a propagation delay, network overhead, and the like.

Figure 2:
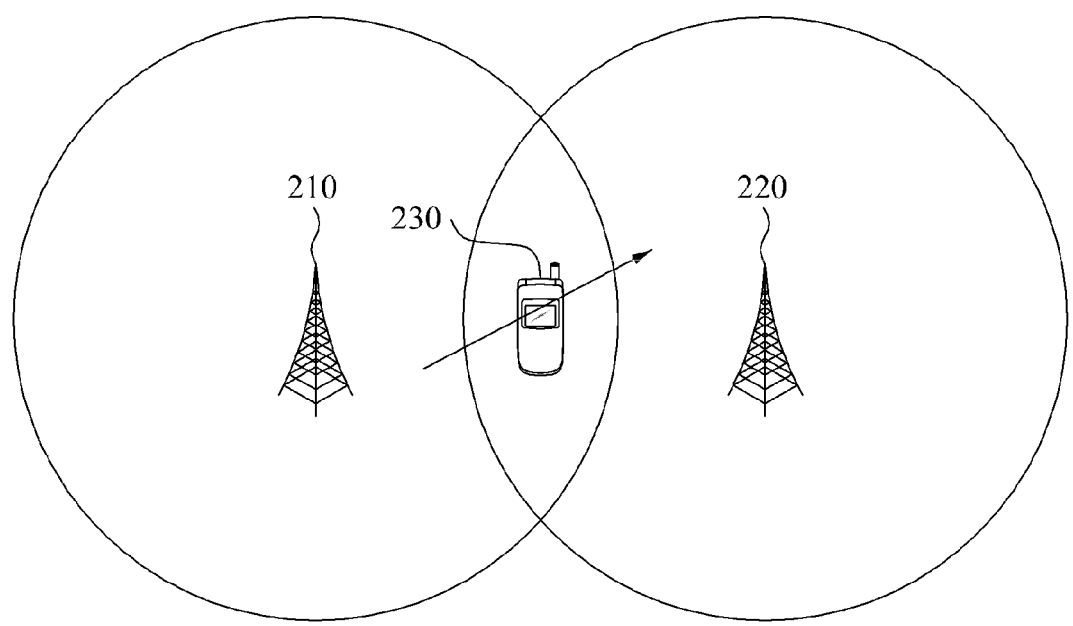
FIG. 2 is a diagram illustrating an example of mobility of a target terminal.

FIG. 2 illustrates an example of mobility of a terminal 230.

Referring to FIG. 2, the terminal 230 is located in a cell edge of each of base stations 210 and 220. It may be understood from a direction indicated by the arrow that the terminal 230 moves from a cell of the base station 210 to a cell of the base station 220. In this example, the base station 210 corresponds to a current serving base station having rights to control the terminal 230.

If the terminal 230 has high mobility, a channel between the base station 210 and the terminal 230, and a channel between the base station 220 and the terminal 230 may quickly vary. If the terminal 230 desires to support CoMP, the terminal 230 may feed back information regarding statuses or variations of the channels to the base station 210, the base station 210 functioning as the serving base station. The feedback process may produce a relatively large amount of overhead. Accordingly, if the terminal 230 moves from the cell of the base station 210 to the cell of the base station 220 at a relatively fast velocity, SP may be preferred over CoMP. Conversely, if the terminal 230 remains near the cell edge or moves at a slow velocity, CoMP may be preferred over SP.

In the above example, the mobility of the terminal 230 may be evaluated based on an actual velocity of the terminal 230, a variation of a channel, a Doppler effect, an amount of overhead for feedback of channel information, and the like. The mobility of the terminal 230 may be evaluated based on a variation of a received signal strength (RSS) with respect to each of the base stations 210 and 220 at the terminal 230.

As described above, according to an embodiment, either an SP scheme or a CoMP scheme may be selected by collectively considering a channel status of a terminal. The channel status may include a mobility of the terminal, gain and feedback overhead produced by CoMP, and the like. Hereinafter, an example of a method of selecting either an SP scheme or a CoMP scheme will be described with reference to FIGS. 3 through 5.

Figure 3:
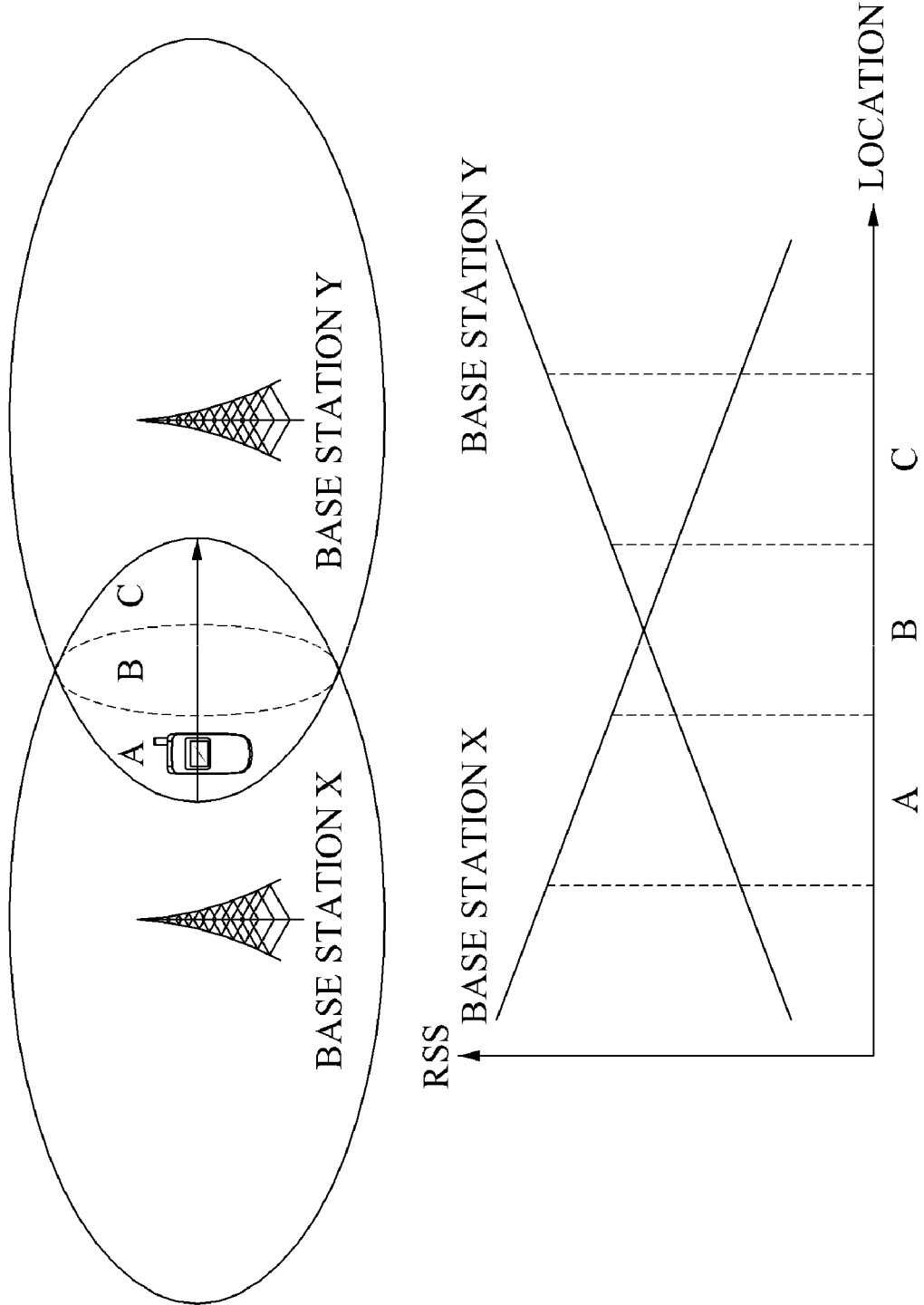
FIG. 3 is a diagram and graph illustrating an example of signal strength received at a terminal, as the terminal moves from a base station X to a base station Y.

FIG. 3 illustrates an example of RSS at a terminal, as the terminal moves from a base station X to a base station Y.

FIG. 4 illustrates an example of selecting an SP scheme or a CoMP scheme, based on a mobility of a terminal when the terminal moves from the base station X to the base station Y in FIG. 3.

Referring to FIG. 3, when the terminal moves from the base station X to the base station Y, the RSS from each of the base station X and the base station Y to the terminal may be expressed as areas A, B, and C as shown in the graph of FIG. 3. The areas A, B, and C may be applicable to both SP and CoMP. Although handover may occur in any of the areas A, B, and C, handover typically occurs in the area B. Here, the term "handover" indicates that a serving base station having a right to control the terminal changes from one base station to another base station.

Referring to FIG. 4, the terminal may pass the areas A, B, and C according to various scenarios. For example, as shown in case 1, the terminal may pass each of the areas A, B, and C at a slow velocity. As shown in case 2, the terminal may pass each of the areas A, B, and C at a fast velocity. As shown in case 3, the terminal may pass the areas A and B at a fast velocity and then pass the area C at a slow velocity. As shown in case 4, the terminal may pass the areas A and B at a slow velocity, and then pass the area C at a fast velocity.

In case 1, the terminal passes the areas A, B, and C at a slow velocity. In this example, a CoMP scheme may be generally preferred over an SP scheme, in order to provide an improved data rate. For example, when the terminal moves at a slow velocity, feedback overhead occurring due to CoMP may be insignificant while a data rate may be significantly improved. In case 1, handover HO may be performed in the area B. When the handover HO is completed, the serving base station of the terminal may be changed from the base station X to the base station Y. Even after completing the handover, the terminal moves at a slow velocity and thus the base station Y may functions as a new serving base station. When the terminal still moves at a low velocity in the area C, a CoMP scheme may again be preferred over an SP scheme. Accordingly, even in the area C, the base station Y may function as the serving base station, such that CoMP may be continuously performed.

In case 2, the terminal passes the areas A, B, and C at a fast velocity. In this example, to prevent an increase in the feedback overhead associated with a CoMP scheme, an SP scheme may be generally preferred over a CoMP scheme. In case 2, the terminal may perform SP with the base station X in the area A. Also in the area B, SP may be performed. In this example, since a handover HO where the serving base station of the terminal changes from the base station X to the base station Y occurs in the area B, the terminal may perform SP with the base station X and then perform SP with the base station Y in the area B. Since the terminal moves at a fast velocity, the handover within in the area B may occur earlier than the handover of case 1. When the terminal still moves at a fast velocity in the area C, an SP scheme may be preferred. Accordingly, even in the area C, the terminal may continuously perform SP with the base station Y.

In case 3, the terminal passes the areas A and B at a fast velocity and then passes the area C at a slow velocity. Since the terminal passes the area A at a fast velocity, the terminal may perform SP with the base station X in the area A. In the area B, the handover HO may be performed at a relatively early point, similar to case 2. Here, the terminal and the base station X are performing SP, and the serving base station changes from the base station X to the base station Y. After handover in the area B, the base station Y and the terminal may perform SP. In this example, if the terminal moves to the area C at a slow velocity, a CoMP scheme may be preferred. Accordingly, in the area C, SP may be terminated and CoMP may be performed. Therefore, in the area C, the base station Y may function as the serving base station whereby the base stations X and Y may perform CoMP with respect to the terminal.

In case 4, the terminal passes the areas A and B at a slow velocity and then passes the area C at a fast velocity. Since the terminal passes the area A at a slow velocity, the base station X functions as the serving base station whereby a CoMP scheme may be selected. In the area B, since the terminal moves at a slow velocity, the CoMP may be continuously performed and then handover HO may occur at a relatively late point, similar to case 1. When the handover is completed, the serving base station of the terminal may change from the base station X to the base station Y. After the handover occurs, the terminal may move at a fast velocity in the area C and thus a SP scheme may be selected. Accordingly, in the area C, the base station Y may function as the serving base station whereby SP may be performed.

In addition to the aforementioned examples of case 1 through case 4, various scenarios may be applicable. For example, in case 3, handover may occur in the area C instead of in the area B. In this example, in the area C, the terminal may perform SP with the base station X and then perform CoMP with the base station Y that is a new serving base station. As another example, in case 4, the handover may occur in the area C instead of in the area B. In this example, in the area C, the terminal may perform CoMP in which the base station X functions as the serving base station, and then may perform SP in which the base station Y functions as the serving base station.

As described above, it is possible to select either a SP scheme or a CoMP scheme according to the channel status of the terminal, including the mobility of the terminal.

FIG. 5 illustrates an example of a transmission and reception controlling method.

The transmission and reception controlling method may be performed by various types of communication apparatuses, for example, a base station, a terminal, a relay, and the like.

In operation 510, the transmission and reception controlling method recognizes information associated with a mobility of a target terminal. The mobility of the target terminal may be evaluated based on an actual velocity of the target terminal, a variation of a channel, a Doppler effect, an amount of overhead for feedback of channel information, and the like. The mobility of the target terminal may be evaluated based on a variation of an RSS with respect to each of base stations at the target terminal. If the transmission and reception controlling method is performed by the terminal, the terminal may directly measure information associated with the mobility of the target terminal. However, if the transmission and reception controlling method is performed at an apparatus such as the base station, information associated with the mobility of the target terminal may be reported from the target terminal.

In operation 520, the transmission and reception controlling method calculates a criterion value according to a predetermined function based on various parameters and information associated with the channel status of the target terminal, including information associated with the mobility of the target terminal. The criterion value may be calculated according to a function f that provided by the following Equation 1:

$$\text{Criterion value} = f(\text{mobility, network load, desired QoS, network delay, propagation delay, allowable feedback overhead}, \dots) \quad (1).$$

If, for convenience, the criterion value is expressed as f(mobility), the transmission and reception controlling method may compare the calculated f(mobility) with a predetermined reference value in operation 530. If the calculated f(mobility) is greater than the reference value (for example, when the mobility of the target terminal is high), an SP scheme may be selected in operation 540. Conversely, if the calculated f(mobility) is less than the reference value (for example, when the mobility of the target terminal is low), a CoMP scheme may be selected in operation 550. Accordingly, if the target terminal has a high mobility, SP may be preferred over CoMP. However, if the target terminal has a low mobility, CoMP may be preferred over SP.

Although not shown in FIG. 5, once either SP or CoMP is selected, a post-process may be performed according to the selected SP or CoMP. In particular, if a transmission and reception scheme is changed, for example, when the transmission and reception, scheme is changed from SP to CoMP or from CoMP to SP, the post-process may be performed such that there is an efficient transition from one transmission and reception scheme to the other. For example, when the transmission and reception scheme is changed from SP to CoMP, the target terminal may feed back information associated with interference channels to the serving base station in order to support CoMP. Accordingly, the serving base station and base stations participating in CoMP may appropriately coordinate radio resources. Conversely, when the transmission and reception scheme is changed from CoMP to SP, the serving base station and the target terminal may perform a post-process according to general communication protocols. When there is a request for changing the serving base station, a post-process for handover may be performed. For example, if the serving base station of the target terminal is to be changed from the base station X to the base station Y, the base station X may hand over a right to control the target terminal to the base station Y. Subsequently, a new control channel may be established between the base station Y and the target terminal, and a control channel between the base station X and the target terminal may be disconnected.

Figure 6A:
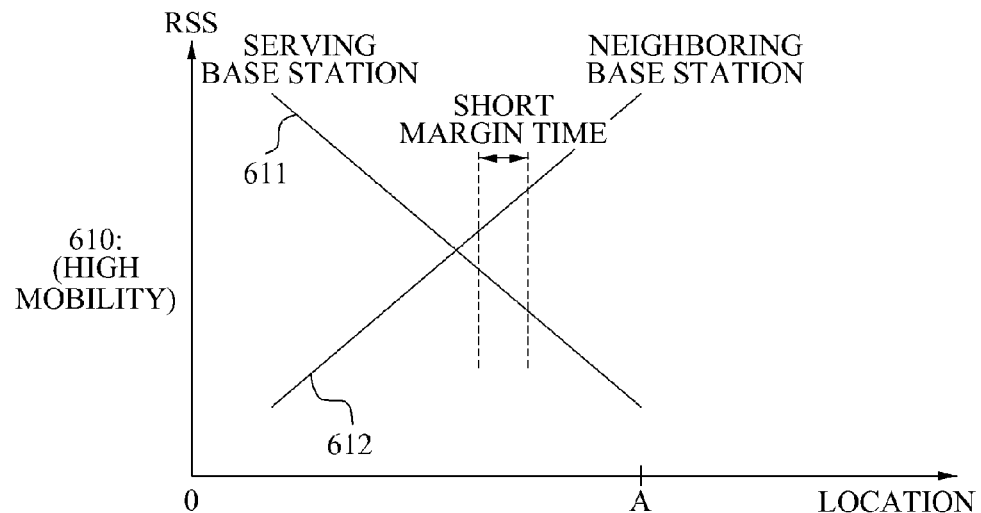
FIGS. 6A and 6B are graphs illustrating examples of margin times for a single-point transmission and reception scheme, with respect to a mobility of a terminal.
Figure 6B:
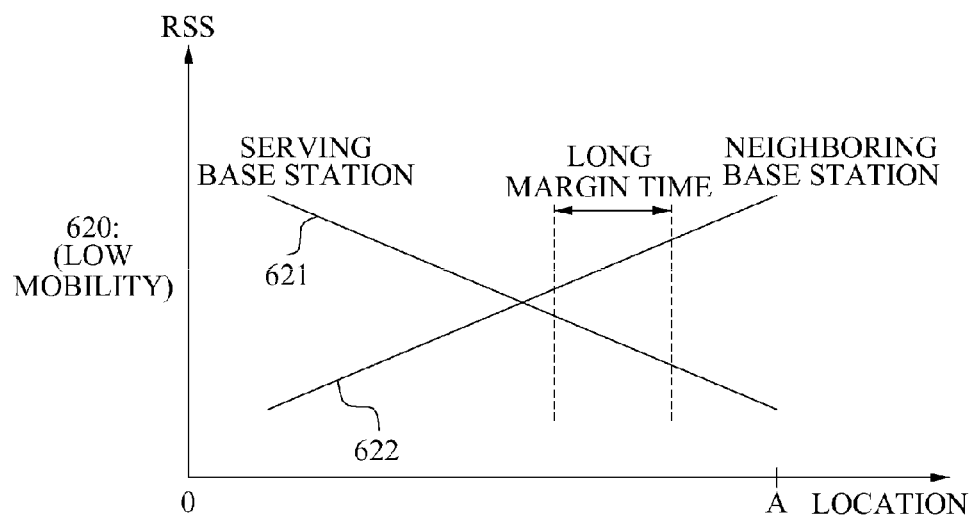

FIGS. 6A and 6B illustrate graphs 610 and 620, which provide examples of margin times for SP, with respect to a mobility of a terminal. Here, each of curves 611 and 621 denotes an RSS of a serving base station, and each of curves 612 and 622 denotes an RSS of a neighboring base station.

The graph 610 of FIG. 6A shows an RSS with respect to each of the serving base station and the neighboring base station at a target terminal when the target terminal has a high mobility. Here, it is provided as an example that the serving base station is located at location "0" and the neighboring base station is located at location "A".

Referring to the graph 610, when the target terminal has a high mobility, the margin time for SP may be set to be short. For example, when the target terminal has a high mobility, it may be ineffective to perform CoMP and thus SP may be preferred over CoMP. Accordingly, the margin time for SP may be set to be short such that SP may be preferentially selected over CoMP. If a condition for SP is continuously satisfied during the margin time for SP, SP may accordingly be selected and performed.

If SP is currently selected and the serving base station is to be changed, a handover may be performed. For example, when performing SP with the base station X as the serving base station and then performing SP with the base station Y as the serving base station, the handover may be implemented. Conversely, if the serving base station is not to be changed, SP may be performed without changing the serving base station.

Referring to the graph 620 of FIG. 6B, when the target terminal has a low mobility, the margin time for SP may be set to be long. For example, when the target terminal has a low mobility, it may be effective to perform CoMP without performing handover at a relatively early point. Accordingly, when the target terminal has a low mobility, the handover may be delayed and the margin time for SP may be set to be long so that CoMP may be performed for a longer period.

Figure 7A:
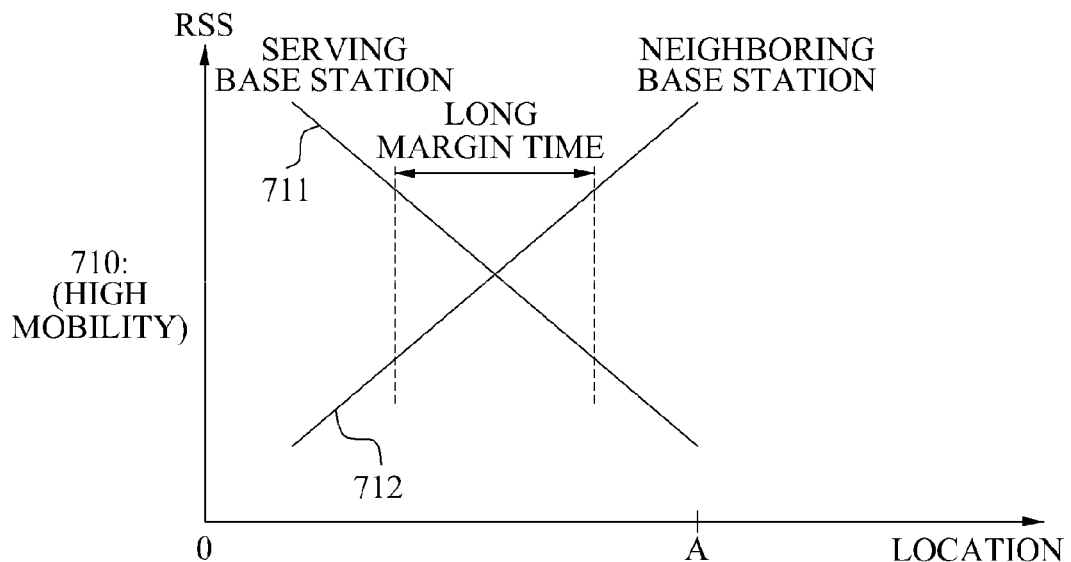
FIGS. 7A and 7B are graphs illustrating examples of margin times for a coordinated multi-point transmission and reception scheme, with respect to a mobility of a terminal.
Figure 7B:
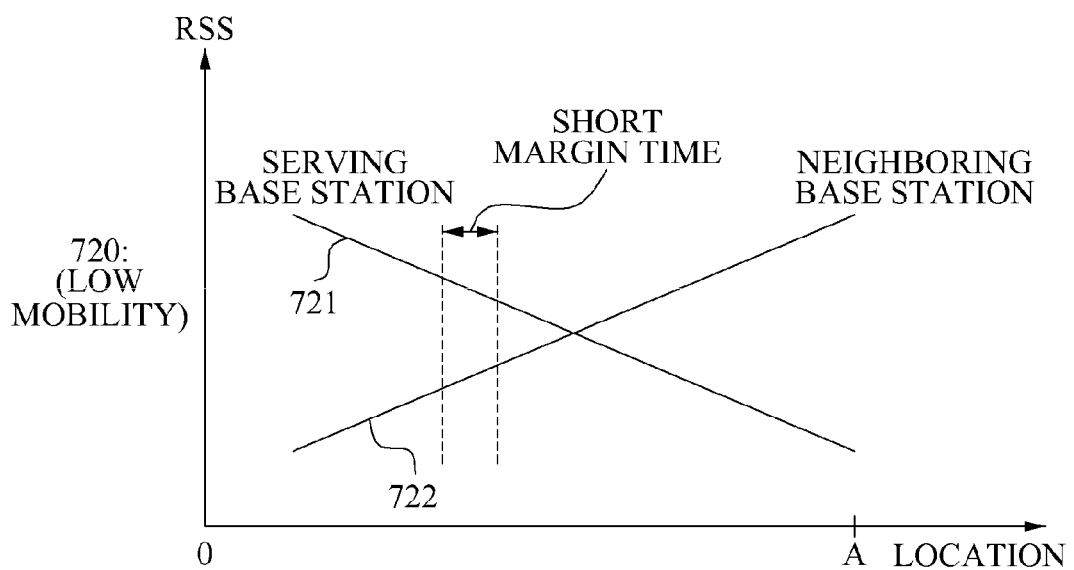

FIGS. 7A and 7B illustrate graphs 710 and 720, which provide examples of margin times for CoMP, with respect to a mobility of a terminal. Here, each of curves 711 and 721 denotes an RSS of a serving base station, and each of curves 712 and 722 denotes an RSS of a neighboring base station.

Referring to graph 710 of FIG. 7A, when the target terminal has a high mobility, the margin time for CoMP may be set to be long. For example, when the target terminal has a high mobility, it may be ineffective to perform CoMP. Accordingly, the margin time for CoMP may be set to be long. If a condition for CoMP is continuously satisfied during the margin time for CoMP, CoMP may accordingly be selected. Therefore, CoMP may be selected less often.

Conversely, referring to the graph 720 of FIG. 7B, when the target terminal has a low mobility, the margin time for CoMP may be set to be short. For example, when the target terminal has a low mobility, it may be effective to perform CoMP in order to improve a data rate to the target terminal. Accordingly, the margin time for CoMP may be set to be short. CoMP may be selected here because the condition for CoMP is continuously satisfied during the short margin time. Accordingly, CoMP may be preferred over SP when the target terminal has a low mobility.

If CoMP is currently selected and the serving base station is to be changed, handover may be performed. For example, when performing CoMP with the base station X as the serving base station and then performing CoMP with the base station Y as the serving base station, the handover may be implemented. Conversely, if the serving base station is not to be changed, CoMP may be performed without changing the serving base station.

Information associated with the mobility of the target terminal may be expressed based on information associated with both an RSS at the target terminal with respect to the serving base station and an RSS at the target terminal with respect to the neighboring base station. In particular, the mobility of the target terminal may be evaluated according to a mobility factor. The mobility factor $\theta_i$ may be provided based on a variation of both the RSS at the target terminal with respect to the serving base station and the RSS at the target terminal with respect to the neighboring base station, as defined by Equation 2:

$$\theta_i = E_k\left(\frac{dP_i^{-\alpha}(t)}{dt} - \frac{dP_0^{-\alpha}(t)}{dt}\right). \tag{2}$$

Here, $P_0$ denotes the RSS at the target terminal with respect to the serving base station 0, $P_i$ denotes the RSS at the target terminal with respect to a neighboring base station i, $\alpha$ denotes a system parameter associated with a pathloss rate, and $E_k()$ denotes the mean of k samples. The mobility factor $\theta_i$ denotes a difference between the variation of the RSS with respect to the neighboring base station and the variation of the RSS with respect to the serving base station at a particular time t; thus, the mobility factor $\theta_i$ may include information associated with a velocity of the target terminal. For example, when a velocity of the target terminal increases, the mobility factor $\theta_i$ may increase. If the target terminal moves in the direction of the neighboring base station, the mobility factor $\theta_i$ may increase. However, if the target terminal moves in the direction of the serving base station, the mobility factor $\theta_i$ may have a negative value.

The margin time $\tau_{SP}$ for SP may be determined based on the mobility factor $\theta_i$ of the target terminal, as defined by Equation 3:

$$\tau_{SP} = \min\left(\frac{\tau_0}{\theta_i}, \tau_{max}\right). \tag{3}$$

Here, $\tau_{max}$ denotes a maximum margin time for SP, and $\tau_0$ denotes a pre-defined system parameter. It can be determined from the above Equation 3 that SP is generally preferred when the target terminal moves in the direction of the neighboring base station at a fast velocity, since the margin time for SP decreases.

The margin time $\tau_{CoMP}$ for CoMP may be defined by the following Equation 4:

$$\tau_{CoMP} = \max(\theta_i \tau_1, \tau_{min}) \tag{4}.$$

Here, $\tau_1$ denotes a pre-defined system parameter and $\tau_{min}$ denotes a minimum margin time for CoMP. It can be determined from the above Equation 4 that $\tau_{CoMP}$ increases when the target terminal moves in the direction of the neighboring base station at a fast velocity, since the mobility factor $\theta_i$ increases. When the target terminal moves in the direction of the neighboring base station at a fast velocity, the condition for CoMP may be satisfied for a long period before the CoMP is selected. Accordingly, when the target terminal moves in the direction of the neighboring base station at a fast velocity, the likelihood that CoMP is selected decreases.

The parameters $\alpha$, $\tau_0$, $\tau_1$, $\tau_{max}$, and $\tau_{min}$ may initially be periodically or aperiodically broadcast by a base station to a terminal. Additionally, a base station may particularly determine a margin time to broadcast to multiple terminals included in a cell. A margin time broadcast by a base station may be a single value or a range of values. As an example, a terminal may store the initially broadcast parameters for use with Equations 2 through 4.

Figure 8:
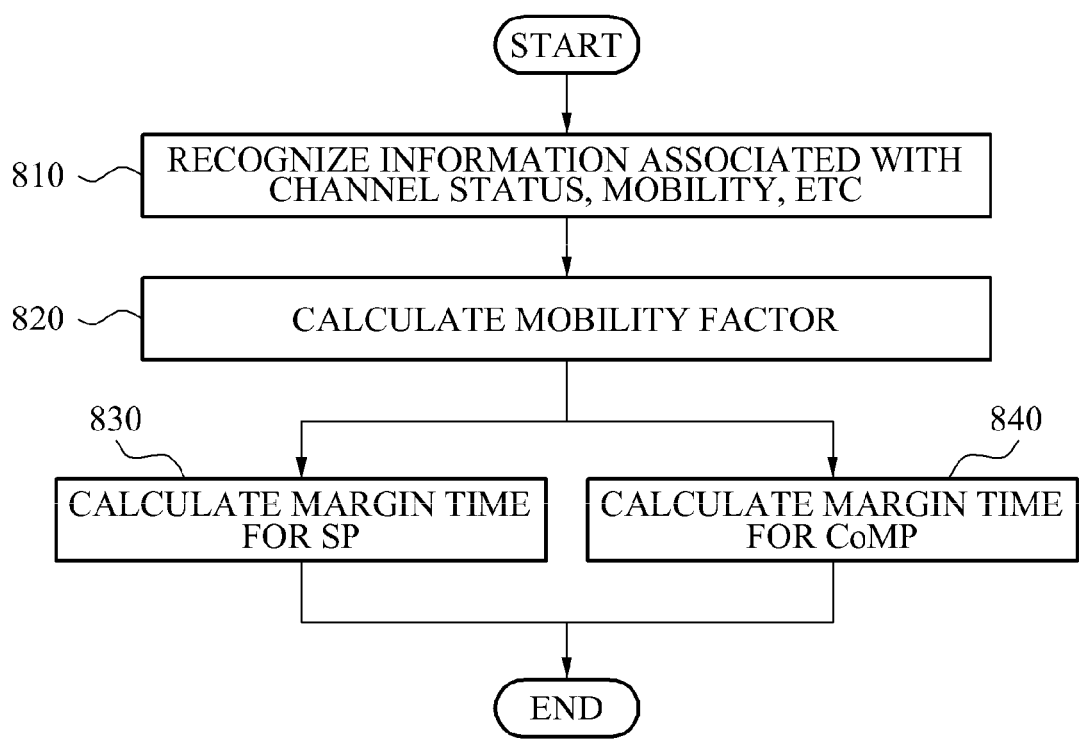
FIG. 8 is a flowchart illustrating an example of a method of calculating a margin time for a single-point transmission and reception scheme and a margin time for a coordinated multi-point transmission and reception scheme transmission and reception.

FIG. 8 illustrates an example of a method of calculating a margin time for SP and a margin time for CoMP.

In operation 810, the margin time calculation method determines information associated with a channel status of a target terminal or information associated with a mobility of the target terminal. Description related to the information associated with channel status and mobile is provided above and thus will be omitted here.

In operation 820, the margin time calculation method calculates a mobility factor $\theta_i$ using the above Equation 2.

In operations 830 and 840, the margin time calculation method calculates the margin time $\tau_{SP}$ for the SP and the margin time $\tau_{CoMP}$ for the CoMP using the above Equation 3 and Equation 4, respectively. The process of calculating the mobility factor $\theta_i$, and the process of calculating the margin time $\tau_{CoMP}$ for the CoMP and the margin time $\tau_{SP}$ for the SP are provided above and thus will be omitted here.

FIG. 9 illustrates a table that provides examples of operations based on a variation in each of a margin time for SP and a margin time for CoMP, when a mobility of a terminal increases or decreases.

Referring to FIG. 9, when a movement velocity of the target terminal increases, the mobility factor $\theta_i$ increases. Conversely, when the movement velocity of the target terminal decreases, the mobility factor $\theta_i$ decreases.

For example, when the movement velocity of the target terminal increases, the mobility factor $\theta_i$ may increase. Accordingly, the margin time $\tau_{SP}$ for SP may decrease and the margin time $\tau_{CoMP}$ for CoMP may increase. Therefore, when the target terminal has a high velocity, SP may be performed at a relatively early point. Further, CoMP may not be performed or may be performed at a relatively late point.

Conversely, when the movement velocity of the target terminal decreases, the mobility factor $\theta_i$ may decrease. Accordingly, the margin time $\tau_{SP}$ for SP may increase and the margin time $\tau_{CoMP}$ for CoMP may decrease. Therefore, the CoMP may be performed at a relatively early point. Further, SP may not be performed or may be performed at a relatively late point.

Figure 10:
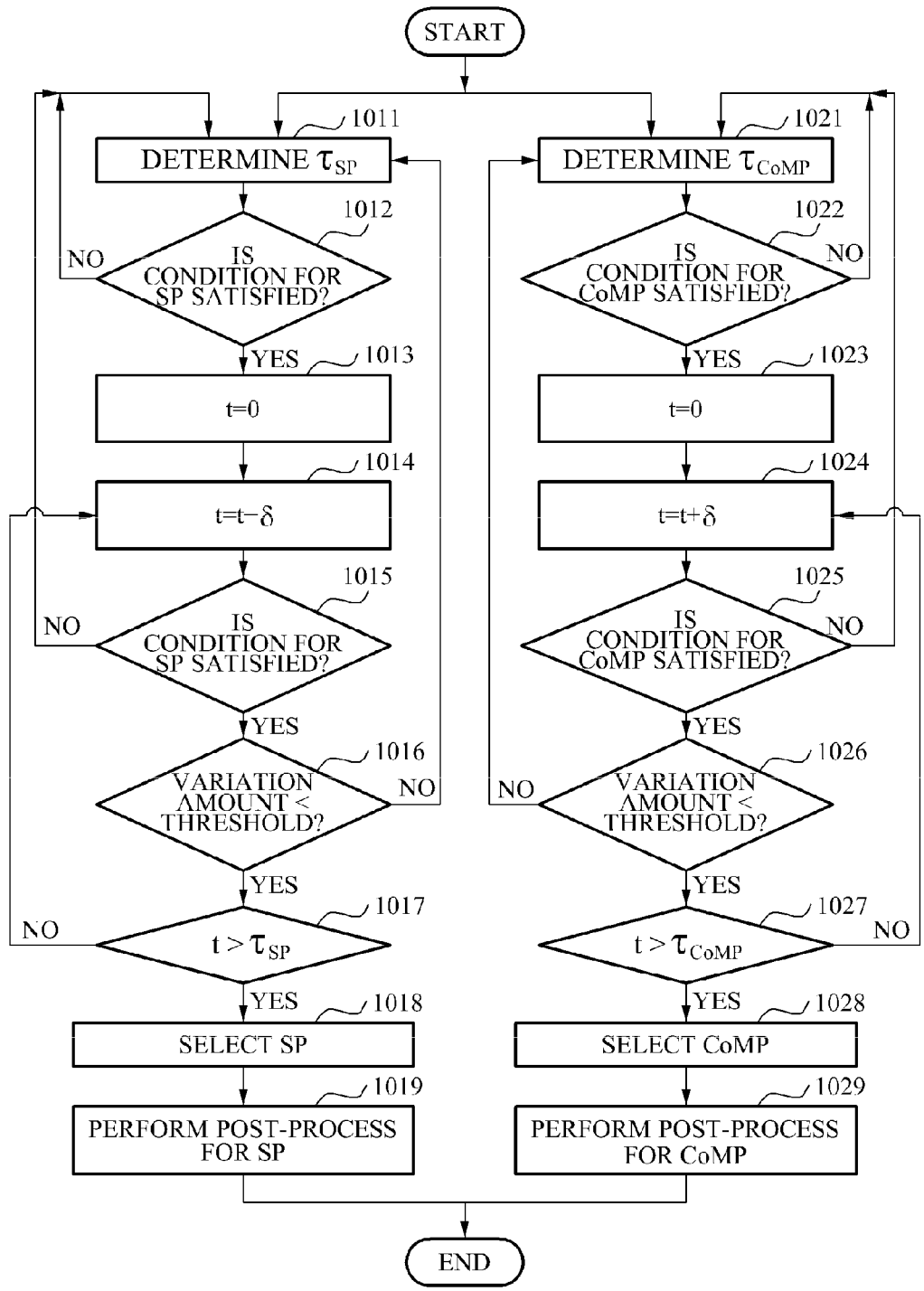
FIG. 10 is a flowchart illustrating an example of margin time implemented in a transmission and reception controlling method.

FIG. 10 illustrates an example of margin time implemented in a transmission and reception controlling method.

A process for verifying whether a condition for SP is continuously satisfied during a corresponding margin time, and a process for verifying whether a condition for CoMP is continuously satisfied during a corresponding margin time may be independently performed.

If the margin time $\tau_{SP}$ for SP is determined in operation 1011, the transmission and reception controlling method verifies whether the condition for SP is satisfied in operation 1012. Whether the condition for SP is satisfied may be determined based on an RSS to a terminal from a serving base station or an RSS to a terminal from a neighboring base station.

If the condition for SP is satisfied, the transmission and reception controlling method sets a time t of a timer to zero in operation 1013, and increments the time t of the timer by $\delta$ in operation 1014. Conversely, if the condition for SP is not satisfied, the transmission and reception controlling method again performs operation 1011.

In operation 1015, the transmission and reception controlling method verifies whether the condition for SP is satisfied during t+$\delta$. In this example, if the condition for SP is satisfied, the transmission and reception controlling method verifies whether a variation amount of a mobility factor $\theta_i$ is less than a threshold in operation 1016. Conversely, if the condition for SP is not satisfied, the transmission and reception controlling method again performs operation 1011.

If the variation amount of the mobility factor $\theta_i$ is greater than or equal to the threshold, the transmission and reception controlling method again performs operation 1011. Conversely, if the variation amount of the mobility factor $\theta_i$ is less than the threshold, the transmission and reception controlling method verifies whether the time t of the timer is greater than the margin time $\tau_{SP}$ for SP in operation 1017. For example, if the time t of the timer is greater than the margin time $\tau_{SP}$ for SP, it may indicate that the condition for SP is continuously satisfied during the margin time $\tau_{SP}$ for SP. Accordingly, in operations 1018 and 1019, the transmission and reception controlling method selects SP and performs a post-process for SP. Conversely, if the time t of the timer is less than the margin time $\tau_{SP}$ for SP, the transmission and reception controlling method again performs operation 1014, incrementing the time t of the timer by $\delta$. The post-process for SP may include various processes, for example, a process for handover, a process performed due to a change of the transmission and reception scheme, and the like.

If the margin time $\tau_{CoMP}$ for CoMP is determined in operation 1021, the transmission and reception controlling method verifies whether the condition for CoMP is satisfied in operation 1022. Whether the condition for CoMP is satisfied may be determined based on an RSS to a terminal from the serving base station or an RSS to a terminal from the neighboring base station.

If the condition for CoMP is satisfied, the transmission and reception controlling method sets the time t of the timer to zero in operation 1023 and increments the time t of the timer by $\delta$ in operation 1024. Conversely, if the condition for CoMP is not satisfied, the transmission and reception controlling method again performs operation 1021.

In operation 1025, the transmission and reception controlling method verifies whether the condition for CoMP is satisfied during t+$\delta$. In this example, if the condition for CoMP is satisfied, the transmission and reception controlling method verifies whether a variation amount of the mobility factor $\theta_i$ is less than a threshold in operation 1026. Conversely, if the condition for CoMP is not satisfied, the transmission and reception controlling method again performs operation 1021.

If the variation amount of the mobility factor $\theta_i$ is greater than or equal to the threshold, the transmission and reception controlling method again performs operation 1021. Conversely, if the variation amount of the mobility factor $\theta_i$ is less than the threshold, the transmission and reception controlling method verifies whether the time t of the timer is greater than the margin time $\tau_{CoMP}$ for CoMP in operation 1027. For example, if the time t of the timer is greater than the margin time $\tau_{CoMP}$ for CoMP, it may indicate that the condition for CoMP is continuously satisfied during the margin time $\tau_{CoMP}$ for CoMP. Accordingly, in operations 1028 and 1029, the transmission and reception controlling method selects CoMP and performs a post-process for CoMP. Conversely, if the time t of the timer is less than the margin time $\tau_{CoMP}$ for CoMP, the transmission and reception controlling method again performs operation 1024, incrementing the time t of the timer by $\delta$. The post-process for CoMP may include various processes, for example, a process for handover, a process performed due to a change of the transmission and reception scheme, and the like.

FIG. 11 illustrates an example of signal reception at a moving terminal with respect to signals transmitted from a plurality of base stations, in CoMP.

Referring to FIG. 11, a current serving base station of the terminal and cooperative base stations 1 and 2 may transmit signals containing the same information through a mutual cooperation.

If distances between the terminal and each of the serving base station and the cooperative base stations 1 and 2 are the same, and the terminal is not moving, signals transmitted from the serving base station and the cooperative base stations 1 and 2 may have the same propagation delay. Here, "propagation delay" indicates a time interval between a time that a signal is transmitted and a time that the signal is received.

In the first graph of FIG. 11, the terminal is not moving. Here, $t_1$ indicates propagation delays of signals transmitted to the terminal from each of the serving base station and the cooperative base stations 1 and 2. For example, $t_1$ may indicate the time of all the received signals at the terminal, with respect to the signals transmitted from each of the serving base station and the cooperative base stations 1 and 2.

If the terminal moves in the direction of the cooperative base station 2, as indicated by the arrow in FIG. 11, the time of the received signals at the terminal, or propagation delays of signals transmitted from base stations, may vary. In this example, since the terminal moves in the direction of the cooperative base station 2, a signal transmitted from the cooperative base station 2 may reach the terminal relatively earlier than a signal transmitted from the current serving base station and a signal transmitted from the cooperative base station 1.

Referring to a second graph of FIG. 11, since the terminal moves in the direction of the cooperative base station 2, the signal transmitted from the cooperative base station 2 may reach the terminal relatively earlier than a signal transmitted from the current serving base station and a signal transmitted from the cooperative base station 1. In the second graph, $t_a$ may indicate the time of the received signal transmitted from the cooperative base station 2, $t_b$ may indicate the time of the received signal transmitted from the cooperative base station 1, and $t_c$ may indicate the time of the received signal transmitted from the current serving base station.

As described above, variations in the time of the received signals and variations in propagation delays may be associated with a movement direction of the terminal. The time of received signals transmitted from a plurality of base stations, or propagation delays of the signals, may be measured. A base station located closest to the movement direction of the terminal may be determined or retrieved by the plurality of base stations based on the measured time of received signals or the propagation delays. The base station closest to the movement direction of the terminal may be set as a serving base station.

A new serving base station may be selected from the plurality of base stations based on the measured time of received signals or propagation delays. Accordingly, handover to the selected new serving base station may be performed. For example, a base station corresponding to a signal that reaches the terminal at relatively earlier than the other signals transmitted from the plurality of base stations may be selected as the new serving base station, and handover to the selected new base station may be performed. According to one example, it is possible to retrieve the new serving base station for the handover from the plurality of base stations without measuring a power of the signals.

Figure 12:
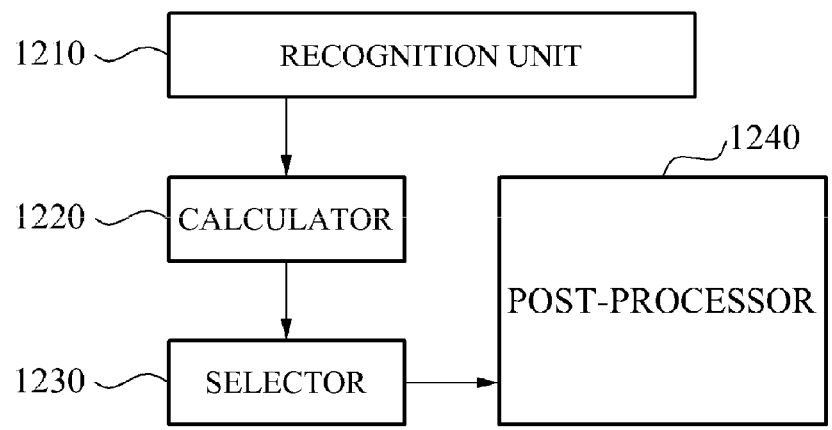
FIGS. 12 through 14 are block diagrams illustrating examples of communication apparatuses.
Figure 13:
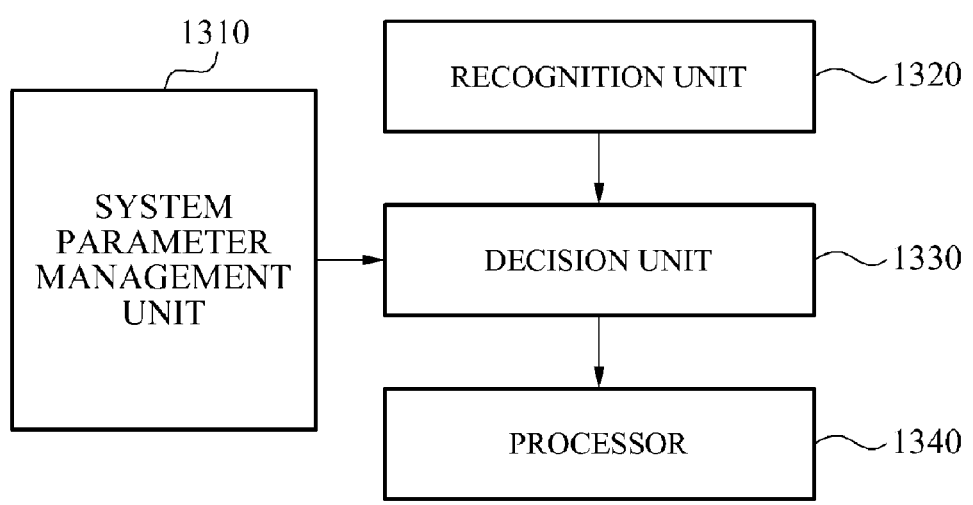
Figure 14:
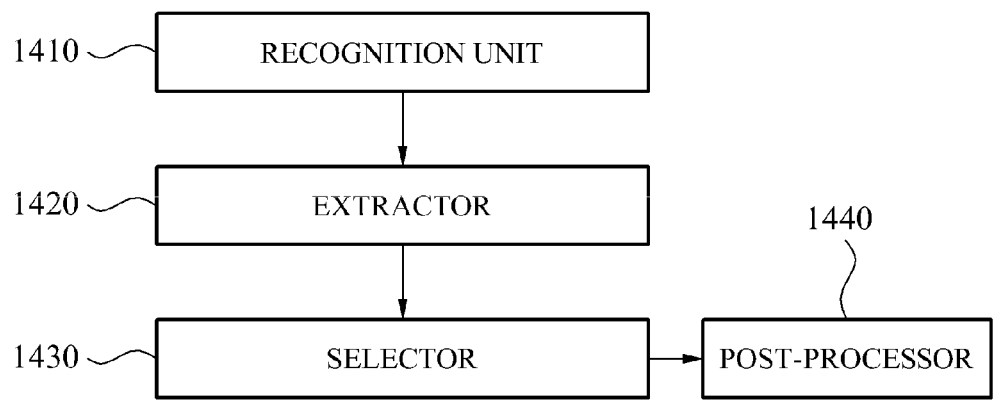

FIGS. 12 through 14 illustrate examples of communication apparatuses. The communication apparatuses may include various types of apparatuses, for example, a base station, a relay, a terminal, a network controller, and the like.

Referring to FIG. 12, the communication apparatus may include a recognition unit 1210, a calculator 1220, a selector 1230, and a post-processor 1240. The recognition unit 1210 may determine information associated with a channel status of a target terminal or a mobility of the target terminal. The calculator 1220 may calculate a criterion value according to a predetermined function, based on information associated with the channel status of the target terminal. The selector 1230 may select SP or CoMP using the criterion value. The post-processor 1240 may perform a post-process for the selected SP or CoMP.

Referring to FIG. 13, the communication apparatus may include a system parameter management unit 1310, a recognition unit 1320, a decision unit 1330, and a processor 1340. The system parameter management unit 1310 may manage and store various types of system parameters. The system parameters may include $\alpha$, $\tau_0$, $\tau_1$, $\tau_{max}$, $\tau_{min}$, and the like. The recognition unit 1320 may determine information associated with a channel status of a target terminal or information associated with a mobility of the target terminal. The decision unit 1330 may determine at least one of a margin time for SP and a margin time for CoMP based on information associated with the channel status of the target terminal. The processor 1340 may perform a process for at least one of SP and CoMP, based on the margin time for SP or the margin time for CoMP.

Referring to FIG. 14, the communication apparatus may include a recognition unit 1410, an extractor 1420, a selector 1430, and a post-processor 1440.

The recognition unit 1410 may determine the time of received signals at a terminal with respect to signals transmitted from a plurality of base stations. For example, if the communication apparatus is a terminal, the recognition unit 1410 may measure the time of received signals transmitted from the plurality of base stations. If the communication apparatus is a base station, the recognition unit 1410 may determine the times of received signals based on information reported from the terminal.

The extractor 1420 may extract propagation delays of the transmitted signals based on the determined times of received signals. The selector 1430 may select at least one base station from the plurality of base stations based on the determined times of received signals in order to determine a serving base station of the terminal. The post-processor 1440 may perform a process for handover of the terminal to the selected base station.

Descriptions made above with reference to FIGS. 1 through 11 may be applicable to the apparatuses illustrated in FIGS. 12 through 14 and thus further descriptions will be omitted here.

The effective SINR (Signal to Interference-plus-Noise Ratio) obtained with respect to a neighboring base station i and coordinated silencing (CS) may be defined by Equation 5:

$$SINR_{CSi} = \frac{P_0}{\sum_{j \neq i} P_j + N}. \qquad (5)$$

Here, $P_0$ denotes the RSS at the target terminal with respect to the serving base station 0, $P_j$ denotes the RSS at the target terminal with respect to a neighboring base station j, and N denotes a background noise power.

Also, the effective SINR obtained with respect to the neighboring base station i and joint processing (JP) may be defined by Equation 6:

$$SINR_{JPi} = \frac{P_0 + P_i}{\sum_{j \neq i} P_j + N}. \tag{6}$$

Figure 15:
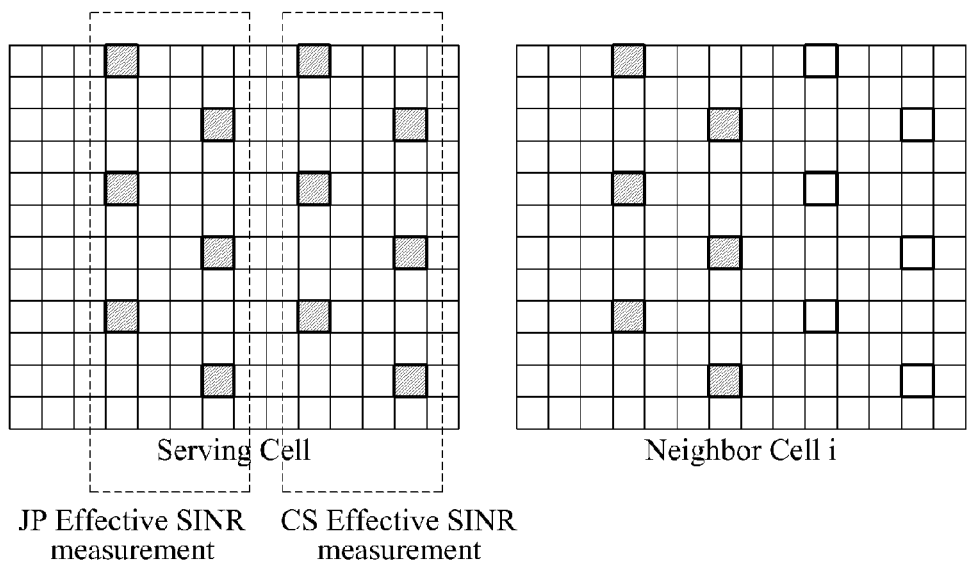
FIG. 15 is a diagram illustrating an example of obtaining an effective SINR measurement with respect to a serving base station and a neighboring base station.

FIG. 15 illustrates an example of obtaining an effective SINR measurement with respect to a reference signal (RS) that may be set according to a serving base station and a neighboring base station. Shaded areas indicate potions corresponding to the RS. The effective SINR with respect to JP may be measured in one area, such that the RS may be provided in similar areas for both a cell including the serving base station and a cell including the neighboring base station. The effective SINR with respect to CS may be measured in another area, for example a nulling resource element area.

Figure 16:
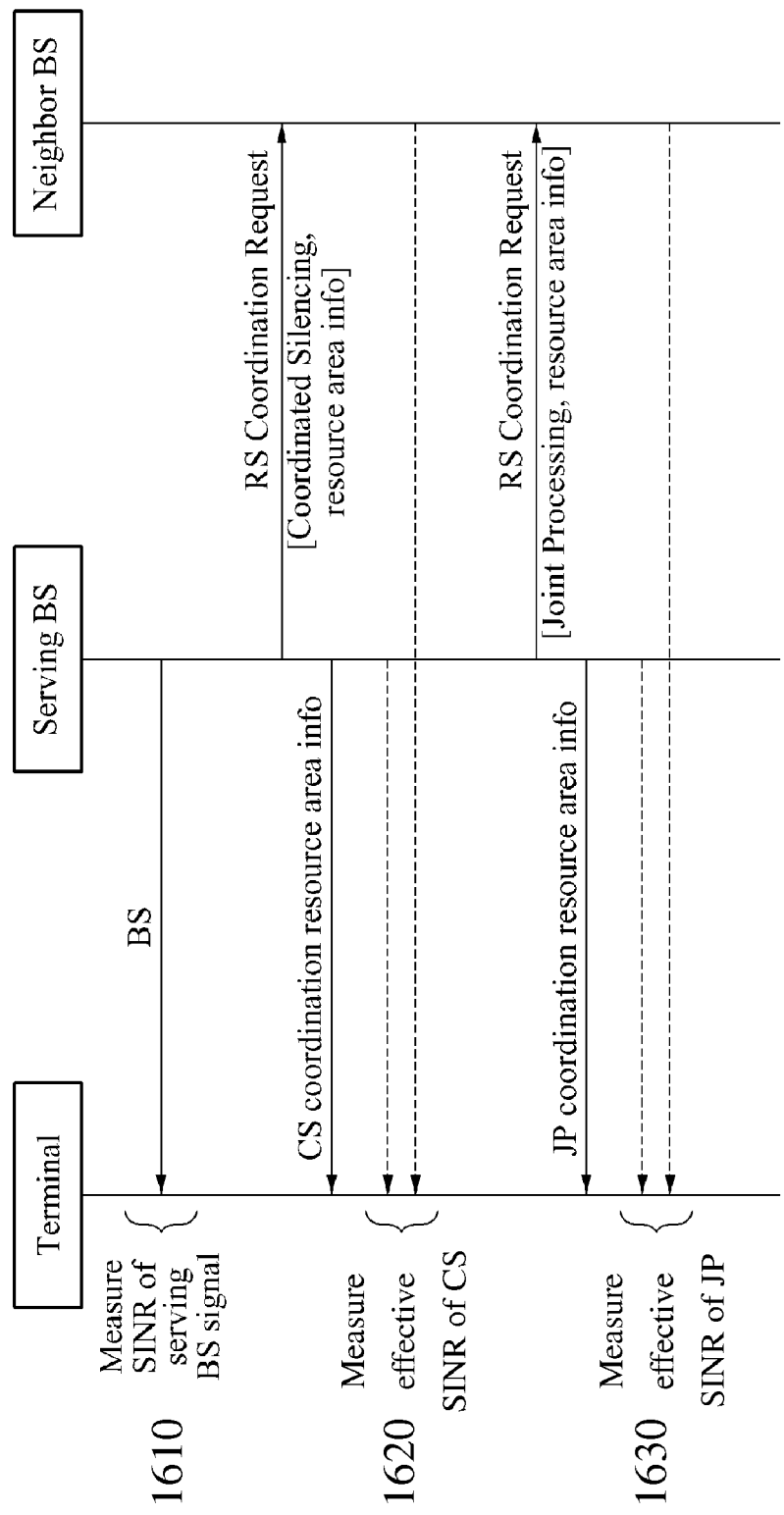
FIG. 16 is a diagram illustrating an example of a coordination procedure that may be implemented with respect to effective SINR measurement.

FIG. 16 illustrates an example of a coordination procedure that may be implemented with respect to effective SINR measurement. In operation 1610, a terminal may measure an SINR with respect to a signal received from a serving base station (BS). If a RS is coordinated between the serving base station and a neighboring base station, the terminal may accordingly measure an effective SINR with respect to JP (operation 1620) or an effective SINR with respect to CS (operation 1630). Resource area information with respect to effective SINR measurement may be determined according to transmissions between the serving base station and the neighboring base station. The serving base station may transmit the resource area information to the terminal prior to an SINR measurement.

The processes, functions, and methods described above, including a transmission and reception controlling method, may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission and reception controlling method, comprising:
   determining information associated with a channel status of a target terminal; and
   selecting, with respect to the target terminal, one of single-point transmission and reception and coordinated multi-point transmission and reception based on the information associated with the channel status of the target terminal.

2. The method of claim 1, wherein the selecting operation further comprises selecting one of single-point transmission and reception and coordinated multi-point transmission and reception based on a variation in the channel status of the target terminal.

3. The method of claim 1, wherein the selecting operation further comprises selecting one of single-point transmission and reception and coordinated multi-point transmission and reception based on a determination of feedback overhead or gain with respect to each of single-point transmission and reception and coordinated multi-point transmission and reception.

4. The method of claim 1, wherein:
   the information associated with the channel status of the target terminal comprises information associated with a mobility of the target terminal.

5. The method of claim 1, wherein the selecting operation further comprises selecting single-point transmission and reception in response to the target terminal having a mobility greater than a reference value.

6. The method of claim 1, wherein the selecting operation further comprises selecting coordinated multi-point transmission and reception in response to the target terminal having a mobility less than a reference value.

7. The method of claim 4, wherein the information associated with the mobility of the target terminal further comprises information associated with at least one of a velocity of the target terminal and a variation in the channel status of the target terminal.

8. The method of claim 1, wherein the selecting operation further comprises:
   calculating a criterion value based on the information associated with the channel status of the target terminal; and
   selecting one of single-point transmission and reception and coordinated multi-point transmission and reception according to the calculated criterion value.

9. The method of claim 1, further comprising:
   performing a post process according to the selected single-point transmission and reception or coordinated multi-point transmission and reception.

10. A transmission and reception controlling method comprising:
    determining a margin time for single-point transmission and reception and a margin time for coordinated multi-point transmission and reception based on information associated with a channel status of a target terminal; and
    selecting one of single-point transmission and reception and coordinated multi-point transmission and reception based on the margin time for single-point transmission and reception and margin time for the coordinated multi-point transmission and reception.

11. The method of claim 10, further comprising:
  determining if a condition for single-point transmission and reception is satisfied with respect to the margin time for single-point transmission and reception; and
  selecting single-point transmission and reception if the condition is satisfied.

12. The method of claim 10, further comprising:
  determining if a condition for coordinated multi-point transmission and reception is satisfied with respect to the margin time for multi-point transmission and reception; and
  selecting coordinated multi-point transmission and reception if the condition is satisfied.

13. The method of claim 10, wherein the determining operation further comprises:
  decreasing the margin time for single-point transmission and reception in response to a mobility of the target terminal increasing; and
  decreasing the margin time for coordinated multi-point transmission and reception in response to a mobility of the target terminal decreasing.

14. The method of claim 10, wherein the determining operation further comprises periodically or aperiodically updating the margin time for single-point transmission and reception and the margin time for coordinated multi-point transmission and reception.

15. The method of claim 10, wherein the information associated with the channel status of the target terminal further comprises information associated with a mobility of the target terminal.

16. The method of claim 15, wherein the information associated with the mobility of the target terminal further comprises information associated with at least one of a velocity of the target terminal and a variation in the channel status of the target terminal.

17. The method of claim 10, further comprising:
  calculating a mobility factor of the target terminal; and
  the determining operation further comprises determining the margin time for single-point transmission and reception and the margin time for coordinated multi-point transmission and reception based on the mobility factor of the target terminal.

18. The method of claim 17, wherein the mobility factor is associated with a variation in a received signal strength at the target terminal with respect to each of a first base station and a second base station.

19. The method of claim 18, further comprising:
  determining an effective signal to interference-plus-noise ratio (SINR) with respect to the received signal strength at the target terminal; and
  determining resource area information based on the determined effective SINR.

20. The method of claim 10, wherein the determining operation further comprises: determining the margin time for single-point transmission and reception and the margin time for coordinated multi-point transmission and reception with respect to a system parameter.

21. The method of claim 20, wherein the system parameter is periodically or aperiodically broadcast from a base station to the terminal.

22. The method of claim 10, wherein the margin time comprises a single value broadcast from a base station to the terminal.

23. The method of claim 10, wherein the margin time comprises a range of values broadcast from a base station to the terminal.

24. The method of claim 10, wherein the selecting operation further comprises performing a process for a handover of the target terminal.

25. A computer-readable recording medium storing a program to control transmission and reception, comprising instructions to cause a computer to:
  determine information associated with a channel status of a target terminal; and
  select, with respect to the target terminal, one of single-point transmission and reception and coordinated multi-point transmission and reception based on the information associated with the channel status of the target terminal.

26. A communication apparatus comprising:
  a recognition unit to determine information associated with a channel status of a target terminal; and
  a selecting unit to select, with respect to the target terminal, one of single-point transmission and reception and coordinated multi-point transmission and reception based on the information associated with the channel status of the target terminal.

27. A communication apparatus comprising:
  a decision unit to determine a margin time for single-point transmission and reception and a margin time for coordinated multi-point transmission and reception based on information associated with a channel status of a target terminal; and
  a processing unit to select one of single-point transmission and reception and coordinated multi-point transmission and reception based on the margin time for single-point transmission and reception and the margin time for coordinated multi-point transmission and reception.

* * * * *